E. W. BENSON.
CULTIVATOR STANDARD AND SHOVEL.
APPLICATION FILED SEPT. 18, 1915.
1,168,469.
Patented Jan. 18, 1916.
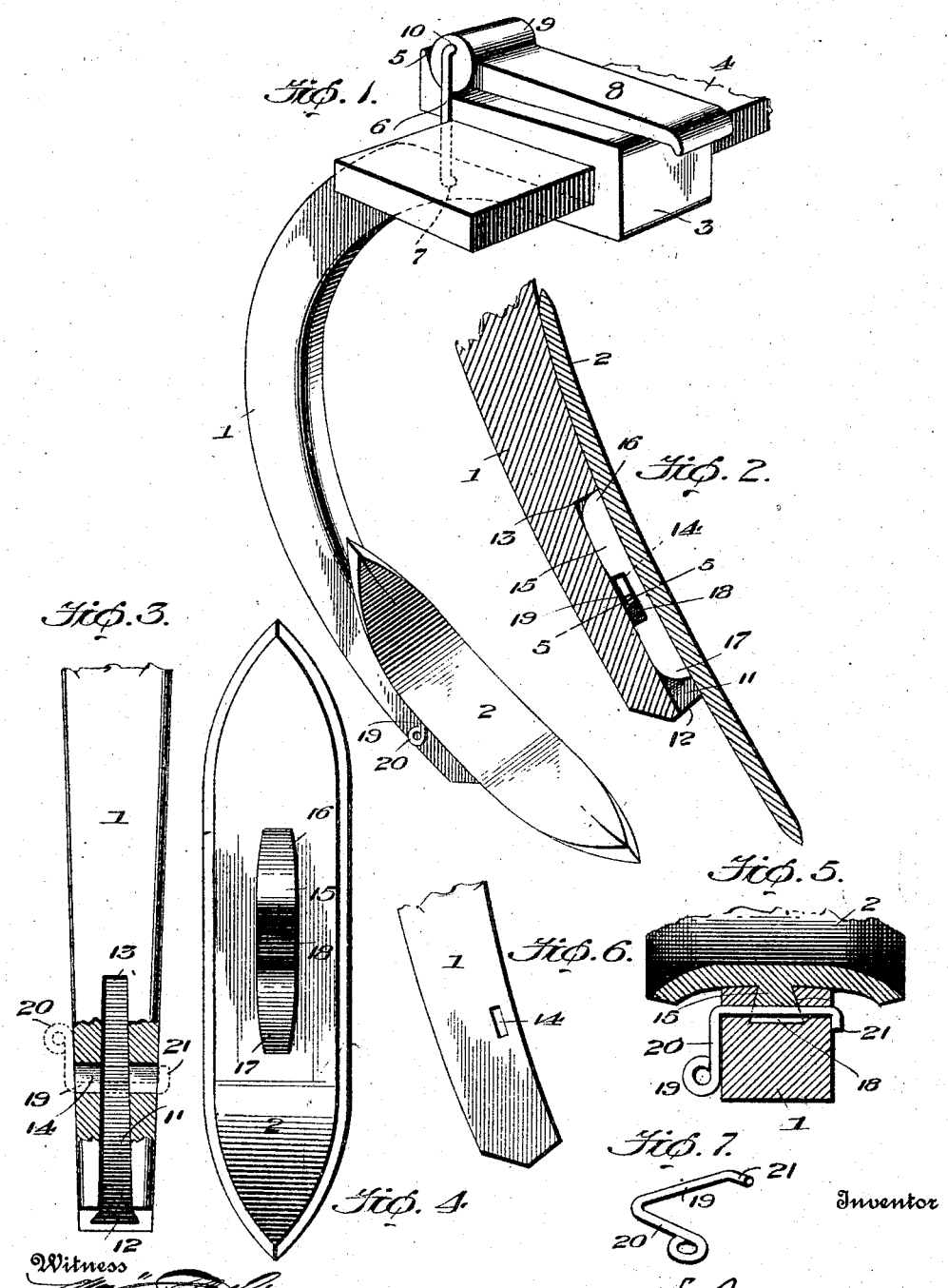

UNITED STATES PATENT OFFICE.

EDGAR W. BENSON, OF RICHMOND, CALIFORNIA, ASSIGNOR OF ONE-HALF TO GEORGE X. FLEMING, OF SACRAMENTO, CALIFORNIA.

CULTIVATOR STANDARD AND SHOVEL.

1,168,469.   Specification of Letters Patent.   Patented Jan. 18, 1916.

Application filed September 18, 1915. Serial No. 51,394.

*To all whom it may concern:*

Be it known that I, EDGAR W. BENSON, a citizen of the United States, residing at Richmond, county of Contra Costa, and State of California, have invented certain new and useful Improvements in Cultivator Standards and Shovels, of which the following is a specification.

This invention relates to cultivator standards and shovels.

My object is to provide, first, a cultivator standard having an improved boltless, quick detachable and adjustable connection with the frame of the cultivator; second, a novel connection between the shovel and the standard, whereby quick setting and adjustment, rigidity and durability are obtained and the pressure of the earth on the shovel tends to more tightly secure the latter to the standard; third, improved means for holding the shovel to the standard and preventing it from dropping out when the shovel is out of the earth, as also insuring its retention when in the earth.

The shovel is double pointed and reversible so that when one point becomes worn, it may be turned about and re-attached to the standard.

The invention comprises fastening means whereby the shovel is secured, by the pressure of the earth, regardless of which point of the shovel is lowermost.

My improvements provide for all necessary or desirable adjustment of both the standard and the shovel to meet any conditions of use.

The embodiment of the invention which is set forth hereinafter and shown in the accompanying drawings is to be considered as illustrative, rather than restrictive, of the scope of the invention, as the latter is susceptible of modification without departing from the essential principles thereof.

In the accompanying drawings: Figure 1 is a perspective of the invention as applied to a section of a cultivator frame; Fig. 2, a longitudinal section through the shovel and standard; Fig. 3, a view looking toward the front of the standard, parts being broken away and in dotted lines; Fig. 4, a detail rear view of the reversible shovel; Fig. 5, an enlarged section on line 5—5, Fig. 2; Fig. 6, a detail of the standard showing one end of the slot; and Fig. 7, a detail perspective of the fastener.

The standard 1 which carries the reversible and detachable shovel 2 has a looped or rebent upper end 3 adapted to snugly, yet easily, fit the flat portion 4 of the cultivator frame. The looped portion 3 is provided with a rounded or inclined cam surface 5 at its free end and on its upper face. A bail 6 is pivoted at 7 to opposite sides of the standard 1. A cam lever 8 has its cam portion 9 journaled on the upper cross portion 10 of the bail 6 and is adapted to bear against the inclined or rounded cam surface 5. When the lever 8 is raised, the tension is released and the looped portion 3 is then sufficiently free of the frame part 4 to permit the standard 1 to be slid lengthwise of said frame part 4. When the lever 8 is pressed down, as shown in Fig. 1, the cam portion 5 exerts tension on the bail 6 and, due to a certain amount of springiness or resiliency in the upper part of the looped portion 3, the latter is clamped firmly against the frame part 4. The lever 8 will remain in its lowered position, as shown in Fig. 1, due to the pivotal part 10 of the bail 6 being slightly off-set toward the free end of the lever. The bail 6 bears against the rear edge of the frame part 4 and prevents any forward displacement of the looped part 3. The pressure is taken, mainly, on the yoke portion of the part 3.

The construction described obviates the necessity for bolting or otherwise clamping the standard 1 to the frame part 4 and, while affording a secure connection therebetween, permits rapid and easy adjustment.

The bail 6 is of such length and the cams 5 and 9 of such height that when the lever 8 is thrown completely over to the left, Fig. 1, it will clear the upper end of the cam 5 and permit complete detachment of the standard from the part 4, by a movement laterally in relation to said frame part 4.

Referring to Figs. 2, 3 and 5, the front of the lower portion of the standard 1 is provided with a groove or channel 11 which is of dove-tail form in cross section and tapers from its lower end 12 to its upper end 13. Extending transversely through the standard is an elongated slot 14 (Figs. 3 and 6) which intersects the groove 11.

The shovel 2 is provided with points at both ends, so that it may be reversed after one end has been worn or damaged. On the rear of the shovel is a rib 15 which is of dovetail form in cross section, as shown in Fig. 5, and is also double ended or tapered at both ends as at 16 and 17, its intermediate portion at the rear, being provided with a somewhat elongated cut-out or recessed portion 18. When either of the ends 16, 17, are inserted in the lower end 12 of the channel 11, the shovel may be forced upwardly and is then more tightly wedged in said channel, the harder the shovel is pushed upwardly in relation to the standard. The pressure of the earth on the shovel is sufficient to maintain this wedging action, but to insure the retention of the shovel, particularly when it is out of the earth, I provide a locking member or fastener 19 of the form shown in Figs. 3, 5 and 7. One portion of the fastener is a handle 20 adapted to lie on one side of the standard 1 and the other end is formed into a retaining hook or tongue 21 which is of a length adapting it to be slipped into the slot 14 and to pass all the way therethrough. On turning the fastener, the parts 20, 21 will lie crosswise of the slot 14 and will be thus maintained by gravity. The middle portion of the fastener is received in the cut-out part 18. The part 18 is of such length that as tight a wedging action may be obtained between the rib 15 and the walls of the channel 11, as necessary to secure the shovel and to compensate for any wear which may occur. To remove the shovel, the fastener 19 is turned to bring the part 21 in alinement with slot 14, whereupon the fastener may be withdrawn and a slight tap of some implement being then delivered on the upper end of the shovel 2, the latter will disconnect from the standard.

By dispensing with bolts and similar substantially permanent connections between the shovel and the standard, I am enabled with my invention, to quickly and easily detach the shovel and reverse it or substitute another shovel.

Having thus described my invention, what I claim as new and desire to secure by Letters Patent, is:—

1. The combination with a cultivator standard having an under-cut slot or channel which tapers from its lower part to its upper end, and an opening intersecting the channel, of a shovel provided with an under-cut rib which is tapered in the direction of its length and is adapted to be received in the channel, said rib having a recess adapted to be brought into line with the opening, and a fastener adapted to be inserted in the opening and in the recess.

2. The combination with a cultivator standard having an under-cut slot or channel which tapers from its lower part to its upper end, and an opening intersecting the channel, of a double ended reversible shovel provided with an under-cut double ended rib tapered at both of its ends and provided with a recess in its face, said rib being arranged so that either of its tapered ends may be inserted into the channel or slot with a wedging action and to bring the recess in line with the opening in the standard, and a fastener adapted to be inserted in the opening and in the recess to prevent detachment of the shovel.

3. The combination with a cultivator standard having an under-cut slot or channel which tapers from its lower part to its upper end, and an opening intersecting the channel, of a double ended reversible shovel provided with an under-cut double ended rib tapered at both of its ends and provided with a recess in its face, said rib being arranged so that either of its tapered ends may be inserted into the channel or slot with a wedging action and to bring the recess in line with the opening in the standard, and a fastener having angular portions at its respective ends, one of which is of a length slightly less than the width of the opening in the standard, whereby said fastener and said end may be passed through the opening and turned to lock the fastener in position with its intermediate portion received in the recess of the rib.

4. The combination with a cultivator standard having a channel or slot tapered from its lower part toward its upper end and provided with a transverse opening which is elongated in width and intersects the channel aforesaid, of a cultivator shovel having a tapered rib adapted to fit in the channel with a wedging action and provided with a recess adapted to be brought in line with the opening in said standard, and a fastener having angular parts at its ends, one of which is of slightly less length than the width of the opening aforesaid and adapted to be inserted through said opening and to lie in said recess in the rib, whereby, on turning of the fastener, the angular portions thereof will lock it in position.

In testimony whereof, I hereunto affix my signature.

EDGAR W. BENSON.